United States Patent
Lai et al.

(10) Patent No.: US 7,742,780 B2
(45) Date of Patent: Jun. 22, 2010

(54) METHOD AND COMPUTER-READABLE MEDIUM FOR PERFORMING PREDICTIVE NAME COMPLETION, CATEGORIZING CALL LOGS AND ACCESSING DISPATCH ID NUMBERS IN A DATABASE FOR DISPATCH DIALERS

(75) Inventors: Duc Dinh Lai, Chantilly, VA (US); Julio Palacio, Alpharetta, GA (US)

(73) Assignee: Nextel Communications Inc., Reston, VA (US)

( * ) Notice: Subject to any disclaimer, the term of this patent is extended or adjusted under 35 U.S.C. 154(b) by 1167 days.

(21) Appl. No.: 11/156,634

(22) Filed: Jun. 21, 2005

(65) Prior Publication Data

US 2007/0010274 A1 Jan. 11, 2007

(51) Int. Cl.
*H04B 7/00* (2006.01)
*H04Q 7/20* (2006.01)

(52) U.S. Cl. .................. 455/518; 455/519; 455/404.1; 455/507; 370/312; 707/102; 707/2; 707/7

(58) Field of Classification Search .............. 455/404.1, 455/521, 516–519, 564, 507–509, 412, 450; 370/335, 342, 312, 479, 475, 441; 707/1–10, 707/100, 102, 104.1, 201, 204
See application file for complete search history.

(56) References Cited

U.S. PATENT DOCUMENTS

| | | | | |
|---|---|---|---|---|
| 6,134,450 A | * | 10/2000 | Nordeman | 455/517 |
| 6,377,965 B1 | * | 4/2002 | Hachamovitch et al. | 715/203 |
| 6,519,239 B1 | * | 2/2003 | Panchal et al. | 370/335 |
| 6,564,213 B1 | * | 5/2003 | Ortega et al. | 707/5 |
| 6,829,607 B1 | * | 12/2004 | Tafoya et al. | 707/6 |
| 2003/0041044 A1 | * | 2/2003 | Monestere, III | 707/1 |
| 2005/0192041 A1 | * | 9/2005 | Oxley et al. | 455/519 |
| 2005/0288049 A1 | * | 12/2005 | Gill et al. | 455/518 |
| 2006/0068752 A1 | * | 3/2006 | Lin et al. | 455/404.1 |
| 2006/0069577 A1 | * | 3/2006 | Schmitt et al. | 705/1 |
| 2006/0242109 A1 | * | 10/2006 | Pereira et al. | 707/1 |

\* cited by examiner

*Primary Examiner*—Sujatha Sharma

(57) ABSTRACT

A method and computer-readable medium for performing predictive name completion, categorizing call lists and accessing dispatch ID numbers in a database for dispatch dialers is provided. The method for performing predictive name completion includes recognizing a portion of a dispatch ID input by a user; determining a name associated with a dispatch ID, based on the portion of the dispatch ID input by the user, and displaying the name. The method for categorizing call lists includes determining a type of each of a plurality of the dispatch calls; and placing each of the plurality of dispatch calls in one of a plurality of categorized lists, based on the type of each of the plurality of dispatch calls. The method for accessing dispatch ID numbers in a database includes establishing a mirror database including the dispatch ID numbers; and searching the mirror database for particular dispatch ID numbers.

16 Claims, 4 Drawing Sheets

METHOD AND COMPUTER-READABLE MEDIUM FOR PERFORMING PREDICTIVE NAME COMPLETION, CATEGORIZING CALL LOGS AND ACCESSING DISPATCH ID NUMBERS IN A DATABASE FOR DISPATCH DIALERS

BACKGROUND OF THE INVENTION

Wireless communications systems typically provide interconnect and/or dispatch voice communication services. Interconnect voice communication services are those typically provided by most wireless carriers as circuit-switched communications. Dispatch communication services are commonly known as walkie-talkie or push-to-talk (PTT) types of calls, such as the Nextel Communications, Inc. service identified by the trade name Direct Connect. Interconnect voice communication services provided by most wireless carriers can be provided between sources and destinations of different wireless carriers.

A dispatch user interface, which provides an interface for a user of a dispatch calling device, requires that dispatch ID numbers be stored in a database for quick lookup. An example of a database that is used to store dispatch ID numbers is a Microsoft Outlook database, which is also referred to as an Outlook data store. A Microsoft Outlook data store (e.g., Outlook Contacts) has a "radio" field for storage of the dispatch ID. Although the Microsoft Outlook data store contains a field that can be used for the dispatch ID, when a separate dispatch dialer application program is used, the mechanism for accessing and referencing the data store entries is cumbersome and inefficient.

Also, a dispatch dialer interface requires that incoming and outgoing calls be logged, so that a user can quickly reference them and redial the call. However, recent calls lists for interconnect dialers do not support features required for dispatch devices. For example, the recent calls lists for interconnect dialers do not support call alerts, group calls and private calls.

Additionally, the dispatch dialer interface needs to show the proper name associated with a dispatch ID, as it is typed into the user interface. However, interconnect dialers, such as the Microsoft Dialer, do not support this dispatch operation.

SUMMARY OF THE INVENTION

A method and computer-readable medium are provided. In accordance with the present invention, a separate "mirror" database that contains only dispatch IDs allows a dispatch dialer application program to quickly look up entries for outgoing calls, caller ID and call completion. Also, the dispatch dialer may add, delete, and change entries, which may then be synchronized with the corresponding entries in another database.

In accordance with the present invention, a dispatch user interface allows a user to select categorized lists of dispatch calls to view, e.g., dispatch calls in and out, group calls out, call alerts in and out, and all calls.

Also, in accordance with the present invention, as a user types in a dispatch ID, a dispatch dialer references a dispatch ID database (phonebook). Once a positive match is made, even though the user has not completed entering the dispatch ID, the phonebook entry name is displayed on the user interface.

Other objects, advantages and novel features of the present invention will become apparent from the following detailed description of the invention when considered in conjunction with the accompanying drawings.

DETAILED DESCRIPTION OF THE EXEMPLARY EMBODIMENTS

Figure 1:
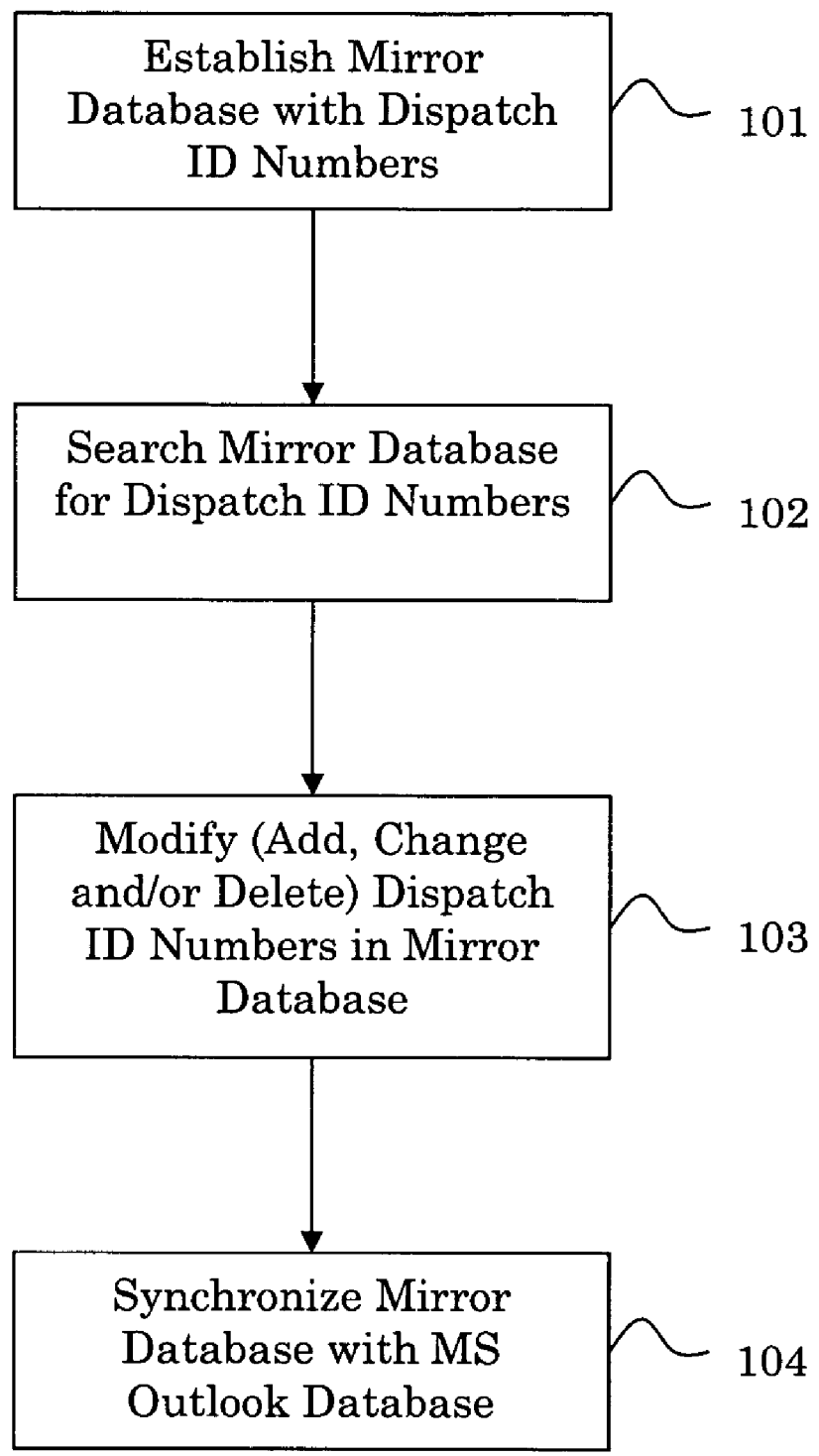
FIG. 1 illustrates an exemplary embodiment of a method for accessing dispatch ID numbers in a database, in accordance with the present invention.

FIG. 1 illustrates an exemplary embodiment of a method for accessing dispatch ID numbers in a database, in accordance with the present invention. As illustrated in FIG. 1, in a dispatch dialer application program, the method for accessing dispatch ID numbers in a database, includes the acts of: establishing a mirror database including the dispatch ID numbers (step 101); and searching the mirror database for particular dispatch ID numbers (step 102). The dispatch ID numbers may be associated with one or more of outgoing calls, caller ID and call completion. The establishing of the mirror database may include extracting the dispatch ID numbers from another database, such as a Microsoft Outlook database, for example. By searching the mirror database for the dispatch ID numbers, rather than searching a larger database, the amount of time needed to search for and locate the desired dispatch ID numbers can be reduced. The mirror database that contains only the dispatch IDs allows the dispatch dialer application program to quickly look up entries for outgoing calls, caller ID and call completion. Thus, the speed and efficiency of the database search is increased.

In another exemplary embodiment, the method further includes modifying the dispatch ID numbers in the mirror database (step 103). The modification of the dispatch ID numbers may include adding a new dispatch ID number, changing an existing dispatch ID number, and/or deleting an existing dispatch ID number. After the modifications are completed, the mirror database can be synchronized with another database, such as the Microsoft Outlook database (step 104), thereby updating the other database.

Figure 2:
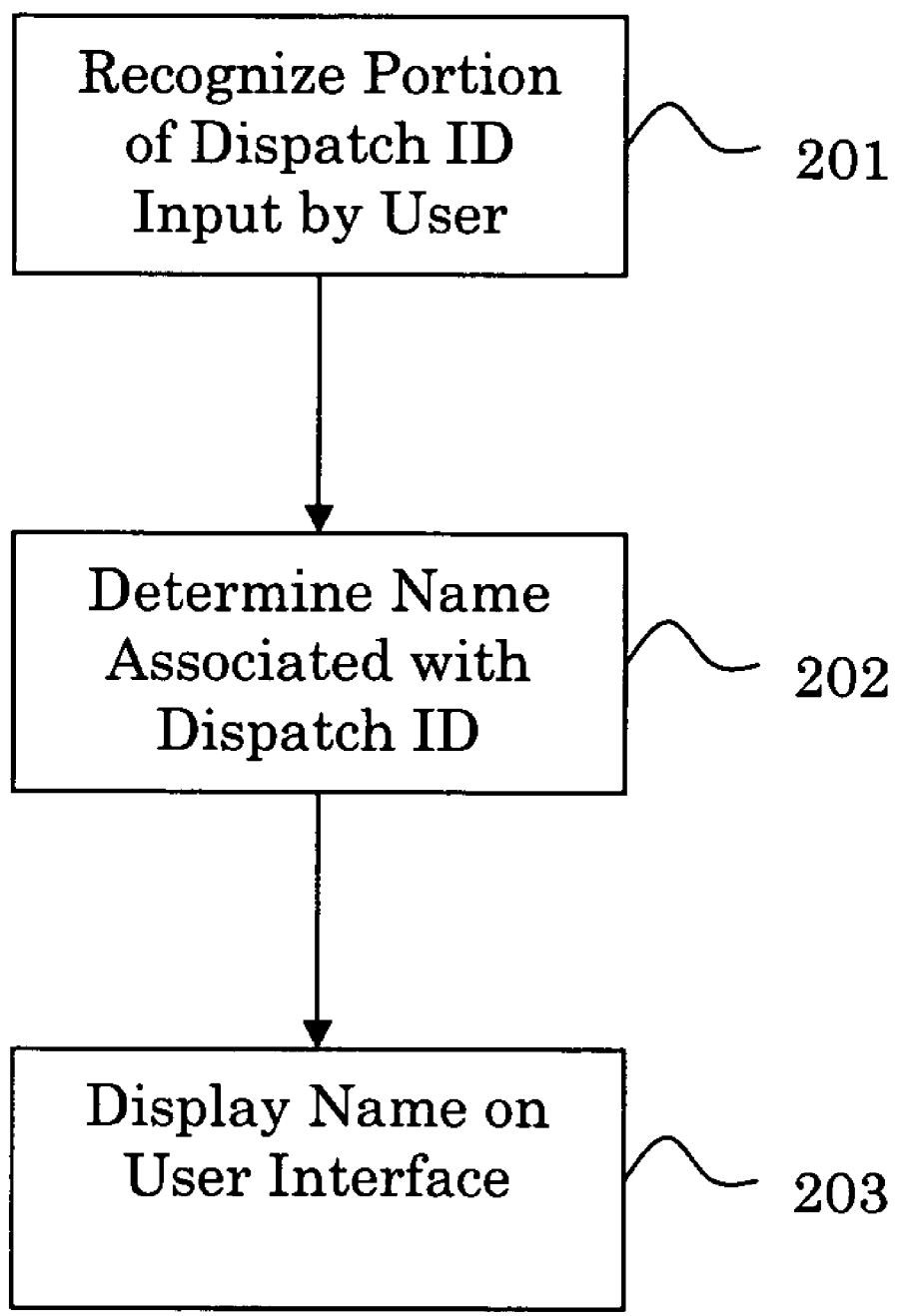
FIG. 2 illustrates an exemplary embodiment of a method for performing predictive name completion in a telecommunications device with a dispatch dialer, in accordance with the present invention.

FIG. 2 illustrates an exemplary embodiment of a method for performing predictive name completion in a telecommunications device with a dispatch dialer, in accordance with the present invention. As the user types in a dispatch ID, the dispatch dialer references the dispatch ID database (phonebook). Once a portion of a dispatch ID input by a user is recognized (step 201), and the name associated with a dispatch ID is determined (step 202), even though the user has not completed entering the dispatch ID, the phonebook entry name is displayed on the user interface (step 203). To determine the name associated with the dispatch ID, a dispatch ID uniquely matching the inputted portion of the dispatch ID may be searched for in a dispatch ID database. The searching may be performed after each of the numbers in the portion of the dispatch ID is entered, or after defined groups of numbers are input.

Figure 3:
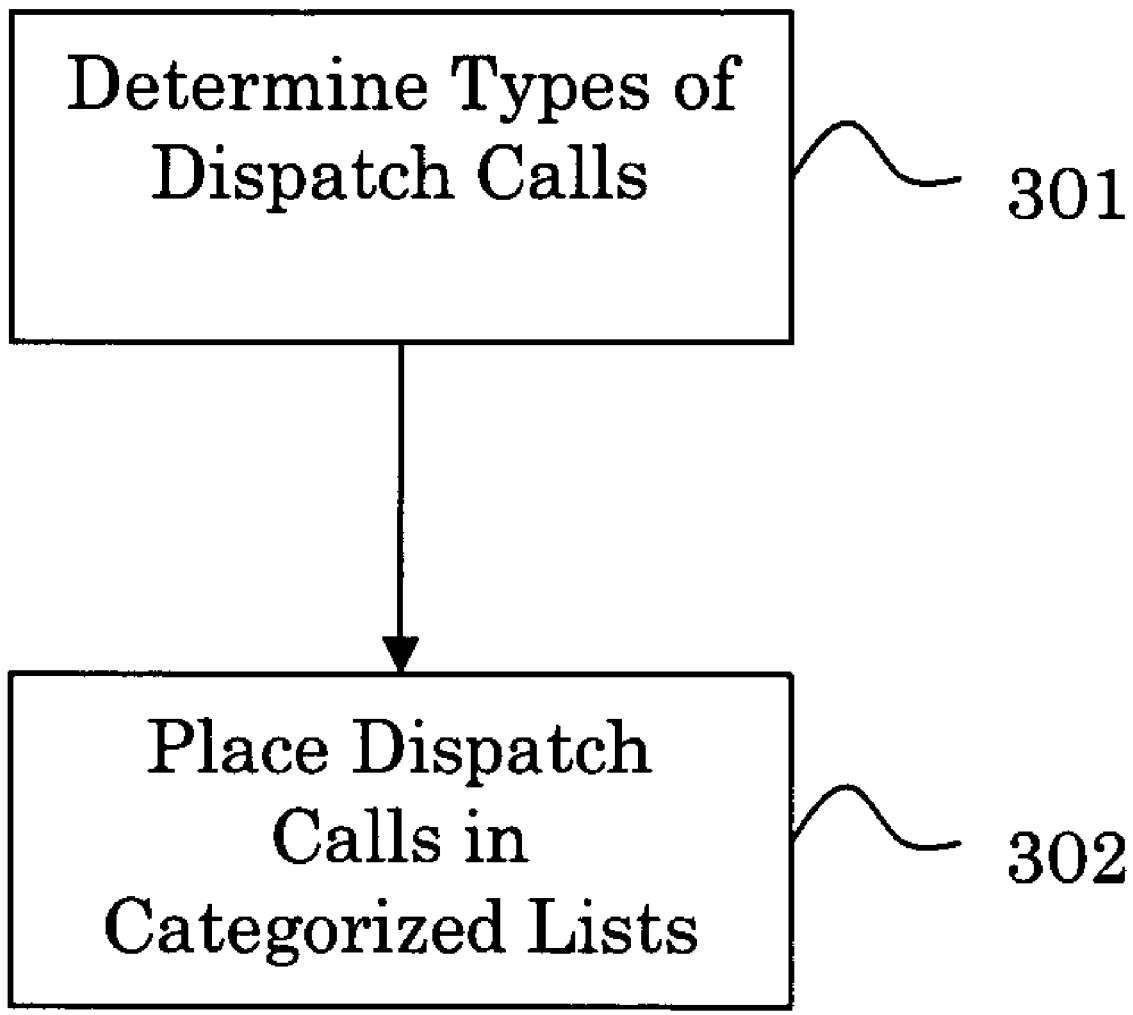
FIG. 3 illustrates an exemplary embodiment of a method for categorizing dispatch calls, in accordance with the present invention.

FIG. 3 illustrates an exemplary embodiment of a method for categorizing dispatch calls, in accordance with the present invention. A dispatch user interface allows a user to select categorized lists of dispatch calls to view, e.g., dispatch calls in and out, group calls out, call alerts in and out, and all calls. According to the method illustrated in FIG. 3, a type of each of the dispatch calls is determined (step 301), and each of the dispatch calls is placed in one of a plurality of categorized lists, based upon the type of dispatch call (step 302). The types of dispatch calls include, for example, dispatch call in, dispatch call out, group call out, call alert in, and call alert out. By placing the calls in categorized lists, the method for categorizing dispatch calls provides the user with additional information about his dispatch calls.

Figure 4:
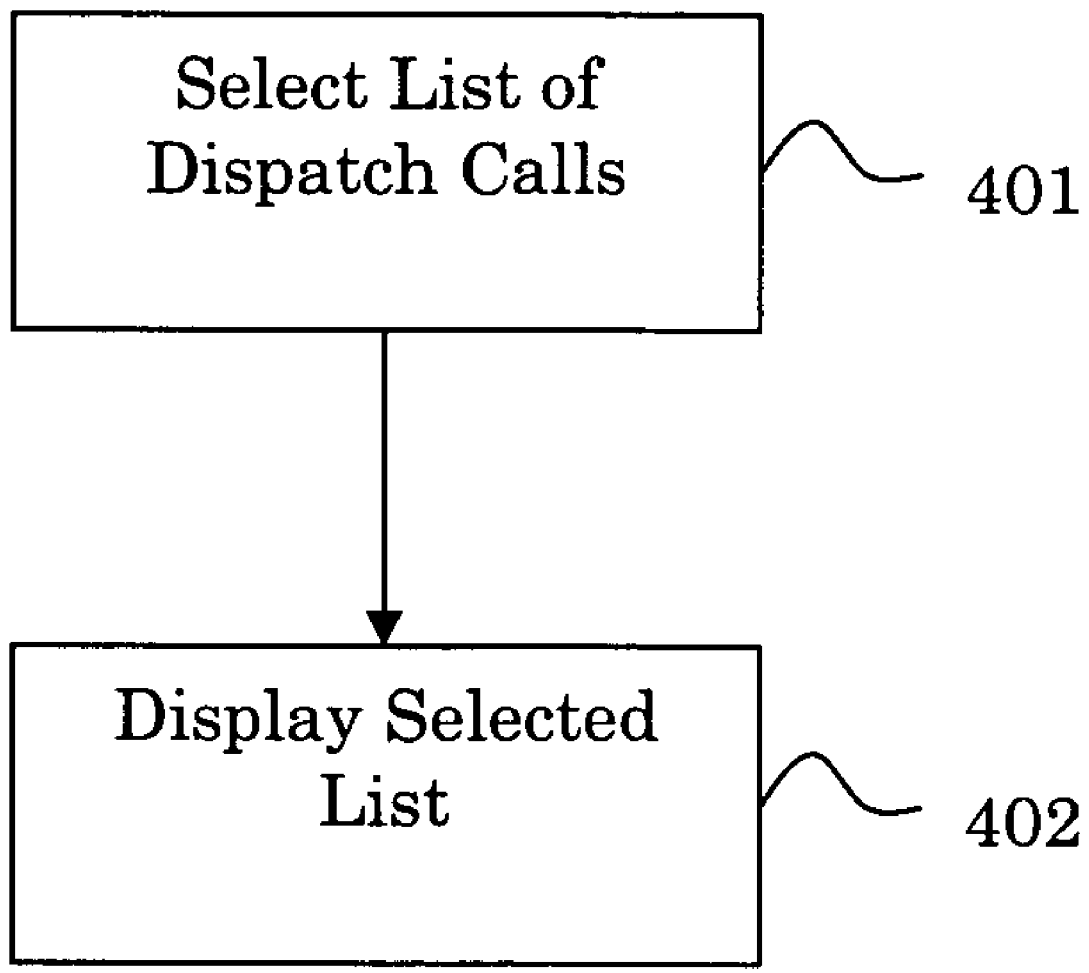
FIG. 4 illustrates an exemplary embodiment of a method for selecting and displaying a plurality of categorized lists of dispatch calls, in accordance with the present invention.

FIG. 4 illustrates an exemplary embodiment of a method for selecting and displaying a plurality of categorized lists of dispatch calls, in accordance with the present invention. As illustrated, the method includes selecting a list of the dispatch calls from the plurality of categorized lists (step 401); and displaying the selected list of the dispatch calls on a user interface (step 402). The categorized lists of dispatch calls include dispatch calls in, dispatch calls out, group calls out, call alerts in, call alerts out, and all calls.

In an exemplary embodiment of the present invention, a computer-readable medium encoded with a computer program for accessing dispatch ID numbers in a database is provided. The term "computer-readable medium" as used herein refers to any medium that participates in providing instructions for execution. Such a medium may take many forms, including but not limited to, non-volatile media, volatile media, and Non-volatile media includes, for example, optical or magnetic disks. Volatile media includes, for example, dynamic memory.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, or any other medium from which a computer can read.

As illustrated in FIG. 1, the computer program includes instructions for: establishing a mirror database including dispatch ID numbers (step 101); and searching the mirror database for particular dispatch ID numbers (step 102). The dispatch ID numbers may be associated with one or more of outgoing calls, caller ID and call completion. In an exemplary embodiment, establishing the mirror database includes extracting the dispatch ID numbers from another database, such as a Microsoft Outlook database. By searching the mirror database for the dispatch ID numbers, rather than searching a larger database, such as the Microsoft Outlook database, the amount of time needed to search for and locate the desired dispatch ID numbers can be reduced. A mirror database, containing only the dispatch ID numbers, allows the dispatch dialer application program to quickly look up entries for outgoing calls, caller ID and call completion. Thus, the speed and efficiency of the database search is increased.

Another exemplary embodiment of the present invention includes a computer-readable medium encoded with a computer program for performing predictive name completion in a telecommunications device with a dispatch dialer, the computer program including instructions for: recognizing a portion of a dispatch ID input by a user (step 201); and determining a name associated with a dispatch ID, based on the portion of the dispatch ID input by the user (step 202). The determining of the name may include uniquely matching the inputted portion of the dispatch ID with a dispatch ID in a dispatch ID database. The matching may be performed after each of the numbers in the portion of the dispatch ID is entered or after defined groups of numbers are input. As illustrated in FIG. 2, the computer-readable medium may further include instructions for displaying the name on a user interface (step 203).

In accordance with another exemplary embodiment of the present invention, a computer-readable medium is encoded with a computer program for categorizing dispatch calls, the computer program including instructions for: determining a type of each of a plurality of the dispatch calls (step 301); and placing each of the plurality of the dispatch calls in one of a plurality of categorized lists, based on the type of each of the plurality of the dispatch calls (step 302), as illustrated in FIG. 3. The categorized lists may include dispatch calls in, dispatch calls out, group calls out, call alerts in, call alerts out, and all calls.

In yet another exemplary embodiment of the present invention, a computer-readable medium is encoded with a computer program for selecting and displaying a plurality of categorized lists of dispatch calls, the computer program including instructions for: selecting a list of the dispatch calls from the plurality of categorized lists (step 401); and displaying the selected list of the dispatch calls (step 402). These instructions are illustrated in FIG. 4. As described above, the categorized lists may include dispatch calls in, dispatch calls out, group calls out, call alerts in, call alerts out, and all calls.

While the invention has been described in connection with various embodiments, it will be understood that the invention is capable of further modifications. This application is intended to cover any variations, uses or adaptation of the invention following, in general, the principles of the invention, and including such departures from the present disclosure as, within the known and customary practice within the art to which the invention pertains.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. In a dispatch dialer application, a method for accessing dispatch ID numbers in a database, the method comprising the acts of:
   establishing a mirror database including the dispatch ID numbers;
   searching the mirror database for particular dispatch ID numbers: and
   searching the mirror database for database entries for outgoing calls, caller ID, and call completion based on the particular dispatch ID numbers.

2. The method of claim 1, wherein the act of establishing the mirror database comprises extracting the dispatch ID numbers from another database.

3. The method of claim 2, wherein the another database comprises a Microsoft Outlook database.

4. The method of claim 1, further comprising modifying the dispatch ID numbers in the mirror database.

5. The method of claim 4, wherein the modifying the dispatch ID numbers comprises at least one of adding a new dispatch ID number to the mirror database, changing one of the dispatch ID numbers in the mirror database, and deleting another one of the dispatch ID numbers from the mirror database.

6. The method of claim 4, further comprising synchronizing the modified dispatch ID numbers in the mirror database with another database.

7. The method of claim 6, wherein the another database comprises a Microsoft Outlook database.

8. A method for categorizing dispatch calls, the method comprising the acts of:
- determining a type of each of a plurality of the dispatch calls; and
- placing each of the plurality of dispatch calls in one of a plurality of categorized lists, based on the type of each of the plurality of dispatch calls.

9. The method of claim 8, wherein the categorized lists include at least one of dispatch calls in, dispatch calls out, group calls out, call alerts in, call alerts out, and all calls.

10. A method for selecting and displaying a plurality of categorized lists of dispatch calls, the method comprising the acts of:
- selecting a list of the dispatch calls from the plurality of categorized lists; and
- displaying the selected list of the dispatch calls.

11. The method of claim 10, wherein the plurality of categorized lists includes at least one of dispatch calls in, dispatch calls out, group calls out, call alerts in, call alerts out, and all calls.

12. A computer-readable medium encoded with a computer program for accessing dispatch ID numbers in a database, the computer program comprising instructions for:
- establishing a mirror database including the dispatch ID numbers;
- searching the mirror database for particular dispatch ID numbers; and
- searching the mirror database for database entries for outgoing calls, caller ID, and call completion based on the particular dispatch ID numbers.

13. A computer-readable medium encoded with a computer program for categorizing dispatch calls, the computer program comprising instructions for:
- determining a type of each of a plurality of the dispatch calls; and
- placing each of the plurality of the dispatch calls in one of a plurality of categorized lists, based on the type of each of the plurality of the dispatch calls.

14. The computer-readable medium of claim 13 wherein the categorized lists include at least one of dispatch calls in, dispatch calls out, group calls out, call alerts in, call alerts out and all calls.

15. A computer-readable medium encoded with a computer program for selecting and displaying a plurality of categorized lists of dispatch calls, the computer program comprising instructions for:
- selecting a list of the dispatch calls from the plurality of categorized lists; and
- displaying the selected list of the dispatch calls.

16. The computer-readable medium of claim 15, wherein the plurality of categorized lists includes at least one of dispatch calls in, dispatch calls out, group calls out, call alerts in, call alerts out, and all calls.

* * * * *